United States Patent [19]

Pomroy

[11] Patent Number: 4,571,474
[45] Date of Patent: Feb. 18, 1986

[54] MICROWAVE OVEN ROTISSERIE AND STIRRER

[75] Inventor: James F. Pomroy, East St. Paul, Minn.

[73] Assignee: Plastics, Inc., St. Paul, Minn.

[21] Appl. No.: 601,617

[22] Filed: Apr. 18, 1984

[51] Int. Cl.³ .............................................. H05B 6/78
[52] U.S. Cl. .................... 219/10.55 F; 219/10.55 E; 219/389; 99/421 P; 99/DIG. 14; 126/388
[58] Field of Search ................. 219/10.55 F, 10.55 E, 219/10.55 A, 10.55 R, 389, 392; 99/421 P, 421 HV, 421 R, 421 H, 421 V, 451, DIG. 14; 126/388

[56] References Cited

U.S. PATENT DOCUMENTS

| | | | |
|---|---|---|---|
| 2,722,172 | 11/1955 | Garbo | 219/389 X |
| 2,939,383 | 6/1960 | Kanaga | 219/389 X |
| 3,502,848 | 3/1970 | Fink | 219/389 X |
| 3,777,095 | 12/1973 | Muranaka | 219/10.55 A |
| 4,048,473 | 9/1977 | Burkhart | 219/389 |
| 4,120,981 | 10/1978 | Burkhart | 426/231 |
| 4,286,133 | 8/1981 | Einset et al. | 219/10.55 F |
| 4,304,177 | 12/1981 | Loeffler et al. | 126/338 X |
| 4,330,696 | 5/1982 | Pomeroy et al. | 219/10.55 F |
| 4,361,744 | 11/1982 | Mercier et al. | 219/10.55 F |
| 4,393,671 | 7/1983 | Ito | 219/10.55 A X |

*Primary Examiner*—Philip H. Leung
*Attorney, Agent, or Firm*—Flehr, Hohbach, Test, Albritton & Herbert

[57] ABSTRACT

Rotisserie/stirrer for microwave ovens having a generally cylindrical food holding container mounted in an inclined position for rotation about both its own axis and a vertically extending axis. Peripheral gear teeth at the lower end of the container mesh with a stationary ring of gear teeth centered about the vertically extending axis and cause the container to rotate about its axis as the container is rotated about the vertically extending axis. A plurality of circumferentially spaced longitudinally extending ribs project inwardly from the side wall of the container and serve as a stirrer for food products in the container.

14 Claims, 4 Drawing Figures

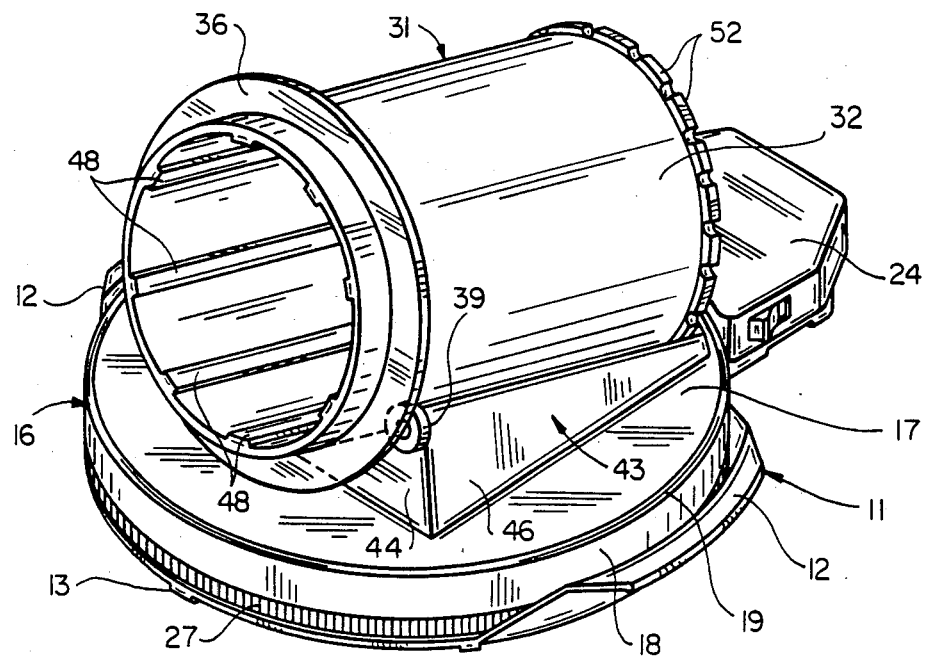
FIG_1
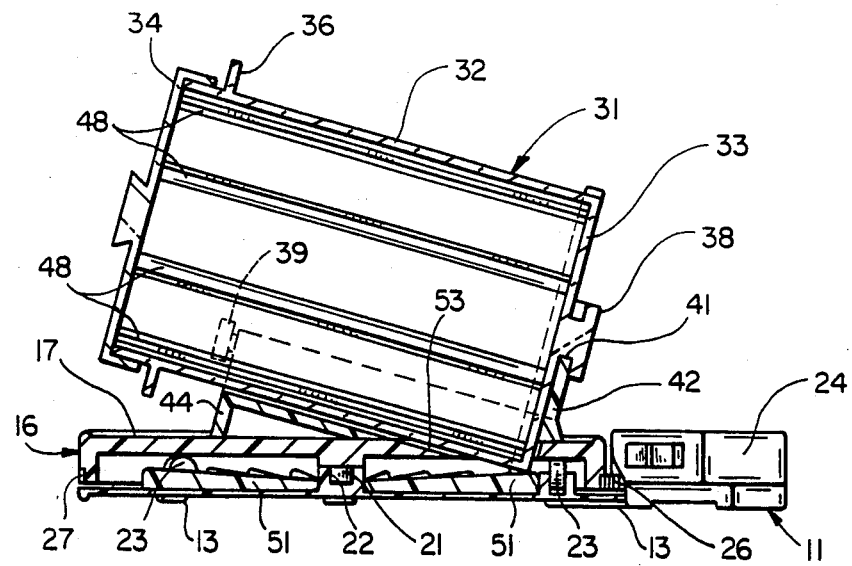
FIG_2

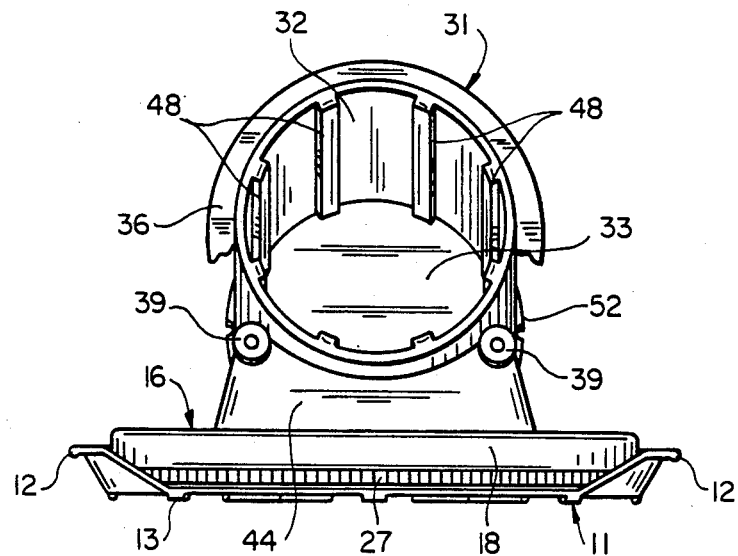
FIG_3
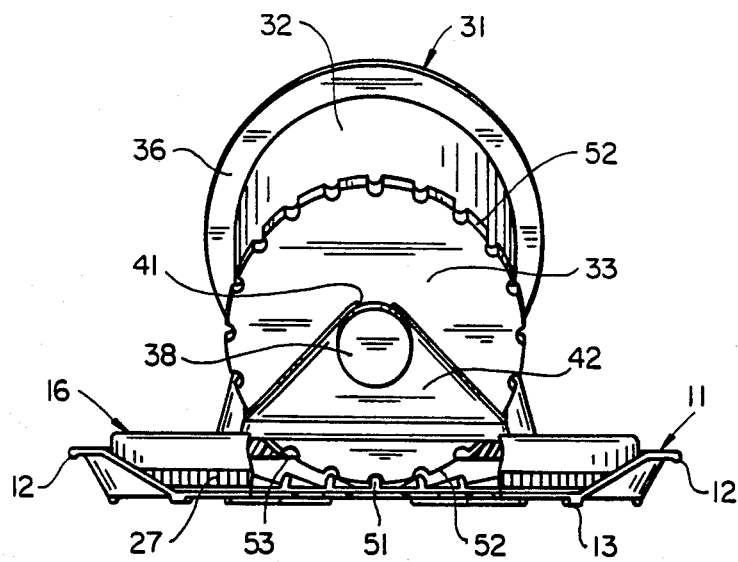
FIG_4

MICROWAVE OVEN ROTISSERIE AND STIRRER

This invention pertains generally to microwave ovens and more particularly to a portable, self-contained rotisserie for turning and stirring food products in a microwave oven.

In recent years, microwave ovens have enjoyed increasing popularity due to their ability to cook many food products faster than conventional ovens or other cooking methods. One disadvantage of such ovens, however, is a tendency to produce uneven cooking of foods because of nonuniform microwave distribution within the oven cavity. To overcome this problem, turntables have been employed in some microwave ovens to move the food horizontally within the microwave field while it is being cooked. Examples of such turntables are found in U.S. Pat. No. 4,330,696.

Nonuniformities in the microwave energy pattern within the oven cavity occur vertically as well as horizontally, and the vertical nonuniformities can produce uneven cooking at different heights. This nonuniformity is particularly noticeable with taller food products such as a roast or a body of liquid in a container. A rotisserie with a spit for simultaneously turning a food product about three axes in a microwave oven is disclosed in U.S. Pat. No. 4,286,133.

It is in general an object of the invention to provide a new and improved rotisserie for turning food products to be cooked in a microwave oven.

Another object of the invention is to provide a rotisserie of the above character which can hold liquids as well as solid food products.

Another object of the invention is to provide a rotisserie of the above character which includes means for stirring food products as they are turned.

These and other objects are achieved in accordance with the invention by providing a rotisserie having a generally cylindrical food holding container mounted in an inclined position for rotation about both its own axis and a vertically extending axis. Peripheral gear teeth at the lower end of the container mesh with a stationary ring of gear teeth centered about the vertically extending axis and cause the container to rotate about its axis as the container is rotated about the vertically extending axis. A plurality of circumferentially spaced longitudinally extending ribs project inwardly from the side wall of the container and serve as a stirrer for food products in the container.

FIG. 1 is an isometric view of one embodiment of a rotisserie/stirrer according to the invention.

FIG. 2 is a vertical sectional view of the embodiment of FIG. 1, with a removable lid mounted on the open end of the food holding container.

FIG. 3 is a front elevational view of the embodiment of FIG. 1.

FIG. 4 is a rear elevational view, partly broken away, of the embodiment of FIG. 1.

As illustrated in the drawings, the rotisserie/stirrer has a generally planar base 11 adapted to rest on a supporting surface such as the floor of a microwave oven cavity. A pair of handles 12 project on opposite sides of the base, and a plurality of mounting feet 13 project from the underside of the base in spaced apart locations and rest upon the oven cavity floor or other supporting surface.

A generally circular platform 16 is rotatively mounted on the base and comprises a horizontally extending deck 17 and a depending peripheral skirt 18. The platform has a relatively low profile, with a diameter on the order of 10 times the height of the skirt. An upstanding rim 19 extends around the outer periphery of the platform deck.

The platform is journaled for rotation about a vertically extending axis by a depending axle 21 received in a bearing 22 carried by the base. The underside of the platform deck rests upon rollers 23 carried by the base at locations spaced about the axis of rotation, whereby the platform is supported for rolling movement about the axis.

A drive motor assembly 24 is mounted on the base to one side of the platform. The drive motor assembly can be of any suitable design for use in a microwave oven, and it can, for example, be either electrically or spring powered. One particularly suitable spring powered motor is described in detail in copending application Ser. No. 397,326, filed July 12, 1982. The drive motor assembly has an output gear 26 which meshes with a peripheral ring of gear teeth 27 on the lower portion of the platform skirt to turn the platform about the vertically extending axis.

A generally cylindrical food holding container 31 is mounted in an inclined position on platform 16, with the axis of the container inclined at a predetermined angle relative to the vertically extending axis about which the platform rotates. The container comprises a generally cylindrical side wall 32 and a generally circular bottom wall 33. The upper end of the container is open and is provided with a removable cover or lid 34. The lid makes a fluid-tight seal with the side wall of the container.

An annular flange 36 is spaced from the upper rim of side wall 32 and projects outwardly from the side wall. This flange serves both as a handle for the container and as a drip catcher or deflector. Without the flange, liquids spilling from the container might run down the outer wall to the drive mechanism where they might accumulate or be relatively difficult to remove. With the flange, any liquid spilling from the inclined container tends to run down the flange and drip directly onto the platform deck where it is easily removed.

Container 31 is rotatively mounted on platform 16 by a short axle or stub shaft 38 which extends axially from the bottom wall of the container and by rollers 39 which engage the outer surface of the cylindrical side wall. Shaft 38 is rotatively received in a bearing 41 which comprises an upwardly facing notch formed in an upright member 42 affixed to the platform near one edge of deck 17. Rollers 39 are rotatively mounted on a support structure 43 which is likewise affixed to the platform. The support structure comprises an end wall 44 and a pair of tapered side walls 46 which extend between the end wall and upright member 42. The container rests on rollers 39 and bearing 41, with the rollers engaging circumferentially spaced portions of side wall 32 toward the open or upper end of the container. Thus, the container simply drops into the supporting structure, and it is readily installed and removed therefrom.

Means is provided for stirring food products as the container rotates about its inclined axis. This means comprises a plurality of circumferentially spaced, longitudinally extending ribs 48 which project inwardly in a radial direction from the side wall of the container.

A circular array of gear teeth 51 are mounted in a stationary position on base 11 beneath the platform deck. These teeth are centered about axle 21 and bearing 22, and in the embodiment illustrated they comprise a ring of upstanding ribs which extend radially from the central portion of the base. A peripheral ring of gear teeth 52 extend radially from the lower end of container 31 and mesh with teeth 51 to impart rotation to the container about its own axis as the container and platform are rotated about the platform axis. The lower portion of the container extends through an opening 53 in the platform deck to permit the gears to mesh.

All of the parts of the rotisserie/stirrer except motor assembly 24 are fabricated of a material which is transparent to microwave energy. The motor assembly may contain metallic parts within a shielding enclosure of suitable design.

Operation and use of the rotisserie/stirrer is as follows. A food product (not shown) to be heated is placed in container 31, and the container is placed on the platform as described above. Drive motor 24 is actuated to rotate the platform and the container about the vertically extending axis of the platform, and as the platform turns, gears 51, 52 rotate the container about its inclined axis. Ribs 48 tend to lift the food product with the rising side wall of the rotating container and allow the product to fall back into the bottom of the container, thus stirring or mixing the product. This produces a natural basting of food products such as a roast having juices which collect in the container.

With liquid food products, lid 34 is employed, and ribs 48 stir the liquid as the container rotates.

The rotisserie/stirrer can be left in the cavity of a microwave oven even when it is not in use, and the container can be readily lifted from and replaced on the remainder of the structure to facilitate the introduction and removal of food products as well as cleaning of the device itself.

The device can also be used as a turntable by replacing platform 16 and container 31 with a platform having a flat deck.

It is apparent from the foregoing that a new and improved rotisserie/stirrer has been provided. While only one presently preferred embodiment has been described in detail, certain changes and modifications can be made without departing from the scope of the invention as defined by the following claims.

I claim:

1. In apparatus for holding a food product to be heated in a microwave oven: a base, a platform mounted on the base for rotation about a vertically extending axis, a food holding container of generally circular cross-section mounted on the platform with the axis of the container being inclined at an angle relative to the vertically extending axis, drive means mounted on the base for rotating the platform and the inclined container about the vertically extending axis, a peripheral ring of gear teeth on the lower end of the container, and a ring of gear teeth mounted in a stationary position on the base in meshing engagement with the gear teeth on the container for turning the container about the inclined axis as the container and the platform rotate about the vertically extending axis.

2. The apparatus of claim 1 wherein the container has a generally cylindrical side wall with a plurality of circumferentially spaced longitudinally extending ribs projecting radially inwardly therefrom to serve as stirrer for a food product in the container.

3. The apparatus of claim 1 wherein the inclined container is rotatively supported by a pair of rollers carried by the platform in rolling engagement with the outer side wall of the container.

4. The apparatus of claim 3 including a shaft which projects axially from the lower end of the container, and means carried by the platform for rotatively supporting the shaft.

5. The apparatus of claim 1 including an annular flange spaced from the upper rim of the container side wall and projecting outwardly from said wall.

6. The apparatus of claim 1 wherein the drive motor is positioned to one side of the platform.

7. In apparatus for holding a food product to be heated in a microwave oven: a circular array of stationary gear teeth centered about a vertically extending axis, a food holding container positioned above the gear teeth with the axis of the container being inclined at an angle relative to the vertically extending axis, a ring of gear teeth carried by the lower end of the container in meshing engagement with the stationary gear teeth, and means for rotating the inclined container about the vertically extending axis with the meshing gear teeth causing the container to rotate about the inclined axis as the container travels about the vertically extending axis.

8. The apparatus of claim 7 wherein the container has a generally cylindrical side wall with a plurality of circumferentially spaced longitudinally extending ribs projecting radially inwardly therefrom to serve as a stirrer for a food product in the container.

9. The apparatus of claim 7 including an annular flange spaced from the upper rim of the cylindrical side wall and projecting outwardly from said wall.

10. The apparatus of claim 7 wherein the drive motor is positioned to one side of the platform.

11. In apparatus for holding a food product to be heated in a microwave oven: a generally planar base which rests on a supporting surface in the oven cavity, a platform mounted on the base for rotation about a vertically extending axis, a food holding container having a generally cylindrical side wall and a generally circular bottom wall with a shaft projecting in an axial direction from the bottom wall, means carried by the platform for supporting the container in an inclined position with the axis of the container being inclined at a predetermined angle relative to the vertically extending axis, said means comprising a bearing rotatively receiving the shaft and a pair of rollers in rolling engagement with the side wall of the container, a circular array of gear teeth mounted in a stationary position on the base and centered about the vertically extending axis, a ring of gear teeth on the lower end of the container in meshing engagement with the gear teeth on the base, and a drive motor mounted on the base for turning the platform and the container about the vertically extending axis with the meshing gear teeth causing the container to rotate about the inclined axis as the container and platform rotate about the vertically extending axis.

12. The apparatus of claim 11 wherein the container has a generally cylindrical side wall with a plurality of circumferentially spaced longitudinally extending ribs projecting radially inwardly therefrom to serve as a stirrer for a food product in the container.

13. The apparatus of claim 11 including an annular flange spaced from the upper rim of the cylindrical side wall and projecting outwardly from said wall.

14. The apparatus of claim 11 wherein the drive motor is positioned to one side of the platform.

* * * * *